United States Patent
Kanakubo

(10) Patent No.: US 7,535,206 B2
(45) Date of Patent: May 19, 2009

(54) SYNCHRONOUS RECTIFYING TYPE SWITCHING REGULATOR CONTROL CIRCUIT AND SEMICONDUCTOR INTEGRATED CIRCUIT INCLUDING THE SAME

(75) Inventor: Yoshihide Kanakubo, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 10/987,545

(22) Filed: Nov. 12, 2004

(65) Prior Publication Data
US 2005/0122750 A1 Jun. 9, 2005

(30) Foreign Application Priority Data
Nov. 14, 2003 (JP) ............................. 2003-385009

(51) Int. Cl.
*G05F 1/613* (2006.01)
(52) U.S. Cl. ..................... 323/223; 323/901; 323/282
(58) Field of Classification Search ............... 323/351, 323/282, 283, 284, 288, 901, 224, 223; 363/21.01–21.16, 363/49, 127
See application file for complete search history.

(56) References Cited

U.S. PATENT DOCUMENTS

| | | | | |
|---|---|---|---|---|
| 5,912,552 A * | 6/1999 | Tateishi | .................... | 323/285 |
| 5,920,475 A * | 7/1999 | Boylan et al. | ............... | 363/127 |
| 5,940,287 A * | 8/1999 | Brkovic | ..................... | 363/127 |
| 6,038,154 A * | 3/2000 | Boylan et al. | ............... | 363/127 |
| 6,191,964 B1 * | 2/2001 | Boylan et al. | ............... | 363/89 |
| 6,348,833 B1 * | 2/2002 | Tsujimoto et al. | ........... | 327/540 |
| 6,396,252 B1 * | 5/2002 | Culpepper et al. | .......... | 323/285 |
| 6,618,274 B2 * | 9/2003 | Boylan et al. | ................. | 363/17 |
| 6,711,039 B2 * | 3/2004 | Brkovic | ..................... | 363/127 |
| 6,760,235 B2 * | 7/2004 | Lin et al. | ................. | 363/21.06 |
| 6,841,977 B2 * | 1/2005 | Huang et al. | ................ | 323/224 |
| 6,850,401 B2 * | 2/2005 | Inoue et al. | ................. | 361/111 |
| 6,853,562 B2 * | 2/2005 | Zhang | ..................... | 363/21.06 |
| 6,912,138 B2 * | 6/2005 | Perry et al. | ............. | 363/21.06 |
| 6,922,041 B2 * | 7/2005 | Goder et al. | ................ | 323/275 |

* cited by examiner

*Primary Examiner*—Akm E Ullah
*Assistant Examiner*—Harry Behm
(74) *Attorney, Agent, or Firm*—Adams & Wilks

(57) ABSTRACT

A synchronous rectifying type switching regulator control circuit has a first reference voltage circuit that receives a soft start signal from a soft start circuit and outputs a first reference voltage. An error amplifying circuit amplifies a difference of the first reference voltage and a divided voltage from a voltage dividing circuit and outputs an error voltage Verr. A first comparing circuit compares a triangular wave from an oscillator with the error voltage Verr and outputs an output pulse Vcomp. A second comparing circuit compares a second reference voltage from a second reference voltage circuit with the error voltage Verr and outputs a voltage ERRcomp. A logic circuit receives the soft start signal, the output pulse Vcomp, and the voltage ERRcomp and outputs a voltage Vcomp2. The logic circuit outputs the output pulse Vcomp when the error voltage Verr is higher than the second reference voltage during a soft start period. A synchronous rectifying circuit outputs a drive signal for driving a switching element when the logic circuit outputs the output pulse Vcomp to the synchronous rectifying circuit in accordance with the soft start signal and the voltage ERRcomp.

7 Claims, 2 Drawing Sheets

SYNCHRONOUS RECTIFYING TYPE SWITCHING REGULATOR CONTROL CIRCUIT AND SEMICONDUCTOR INTEGRATED CIRCUIT INCLUDING THE SAME

BACKGROUND OF THE INVENTION

1. Field of the Invention

The present invention relates to a switching regulator control circuit including a soft start circuit, and more particularly to a switching regulator control circuit capable of performing stable power supply at start-up without discharging charges from an output capacitor at the time of turning on a power source by limiting a duty of an internal oscillating frequency at the time of turning on the power. The present invention also relates to a switching regulator controlled by the synchronous rectifying type switching regulator control circuit and to a semiconductor integrated circuit having the synchronous rectifying type switching regulator control circuit.

2. Description of the Related Art

A switching regulator control circuit that performs oscillating operation until an output voltage reaches a desirable voltage without a limitation on a duty of an oscillating frequency at the time of turning on a power source as shown in a circuit diagram of FIG. 3 has been known as a conventional synchronous rectifying type switching regulator control circuit including a soft start circuit.

Hereinafter, the conventional synchronous rectifying type switching regulator control circuit including the soft start circuit will be described with reference to FIG. 3. First, a voltage level Vout is detected. A difference between a voltage level Va produced by resistive division of divisional resistors 100 and 101 and a voltage level Vref outputted from a reference voltage circuit 106 is amplified by an error amplifying circuit 102 and outputted therefrom as a voltage level Verr. Then, the outputted voltage level Verr and a triangular wave Vosc outputted from an oscillating circuit 104 are compared with each other by a comparing circuit 103 and an voltage level Vcomp is outputted therefrom. In response to the voltage level Vcom, pulses PDRV and NDRV for controlling external switches are outputted from a synchronous rectifying circuit 105 such that a Vout terminal voltage becomes a desirable constant output voltage. The pulses PDRV and NDRV for controlling the external switches are generated at an internal oscillating frequency Vosc and controlled by changing a duty ratio thereof such that the Vout terminal voltage becomes the desirable constant output voltage.

As a specific example of a soft start method which has been known up to now, there is a method of performing soft start using an external capacitor (for example, see JP 08-317637 A (page 2)). When the power source is turned on, an external soft start capacitor 108 is charged at constant current by a soft start circuit 107. Therefore, a potential of the external soft start capacitor 108 gradually rises at the time of turning on the power source. In addition, the voltage level Vref outputted from the reference voltage circuit 106 gradually rises at the time of turning on the power source in proportion to a rise in capacitance of the external soft start capacitor 108. As a result, in the example of the conventional synchronous rectifying type switching regulator control circuit including the soft start circuit, when the voltage level Vref outputted from the reference voltage circuit 106 gradually rises at the time of turning on the power source, a duty of each of the pulses PDRV and NDRV gradually increases from a duty of 0%, so that the Vout terminal voltage gradually rises at the time of turning on the power source. Thus, the power source can be tuned on without causing a rush current to flow between an input power source and an output voltage terminal, so that it is easy to obtain stable power supply without a load on the input power source.

However, in the conventional synchronous rectifying type switching regulator control circuit including the soft start circuit, when any charges are accumulated to same extent in the output capacitor at the time of turning on the power source, there is a case where a voltage difference between an input voltage and an output voltage is small. Here, assume that a state in which the voltage difference between the input and output voltages is small and a duty is low continues. In such a state, although a switch connected between an input terminal and a coil is being turned ON in response to the pulse PDRV, there is no case where a current flows into the coil connected between the input and output terminals. Therefore, when a switch connected between the coil and a VSS terminal is turned ON in response to the pulse NDRV at next timing because the current does not flow between the input and output terminals, a current flows between the output terminal and the VSS terminal through the coil. Thus, there is a problem in that the charges accumulated for outputting flows into the VSS terminal.

SUMMARY OF THE INVENTION

In order to solve the conventional problem, an object of the present invention is to limit a minimal duty (MIN duty) at the time of turning on the power source. That is, even when charges are accumulated in an output capacitor at the time of turning on a power source and thus a difference between input and output voltages is small, a period for which a pulse PDRV becomes a level for turning ON a switch is set to surely allow a current to flow into a coil connected between input and output terminals. Therefore, even when a switch connected between the coil and a VSS terminal is turned ON in response to a pulse NDRV at next timing, the power source is turned on without a release of charges for outputting because energy is held in the coil. More specifically, the followings are provided.

(1) A synchronous rectifying type switching regulator control circuit includes: a circuit portion including a soft start circuit; an oscillator; a first comparing circuit; and a synchronous rectifying circuit, the first comparing circuit comparing an output signal from the circuit portion with an output signal from the oscillator and outputting an output pulse having a limited pulse width based on comparison, and the synchronous rectifying circuit supplying a drive signal for driving a switching element in response to the output pulse, in which when a duty ratio of the output pulse reaches a predetermined duty ratio after a time of turning on a power source, the output pulse is outputted to the synchronous rectifying circuit.

(2) The synchronous rectifying type switching regulator control circuit further includes: a second comparing circuit for comparing the output signal from the circuit portion with a reference voltage; and a logical circuit for outputting the output pulse to the synchronous rectifying circuit based on an output signal from the second comparing circuit. When a lower than the reference voltage, the output pulse is voltage level of the output signal from the circuit portion is prevented from supplying to the synchronous rectifying circuit.

(3) While being different from (2), the output signal from the oscillator is formed in a shape of a triangular wave clipped at a predetermined voltage level.

(4) A semiconductor integrated circuit according to the present invention includes the synchronous rectifying type switching regulator control circuit.

According to the present invention, when a power source is turned on, a duty does not start from 0% but gradually increases from a set minimal duty (MIN duty). As a result, there is an effect that stable power supply can be performed regardless of an output voltage at the time of turning ON of the power source.

DETAILED DESCRIPTION OF THE PREFERRED EMBODIMENT

According to the present invention, when a power source is turned on, a duty does not start from 0% but gradually increases from a set minimal duty (MIN duty). Hereinafter, the present invention will be specifically described with reference to an embodiment.

Figure 1:
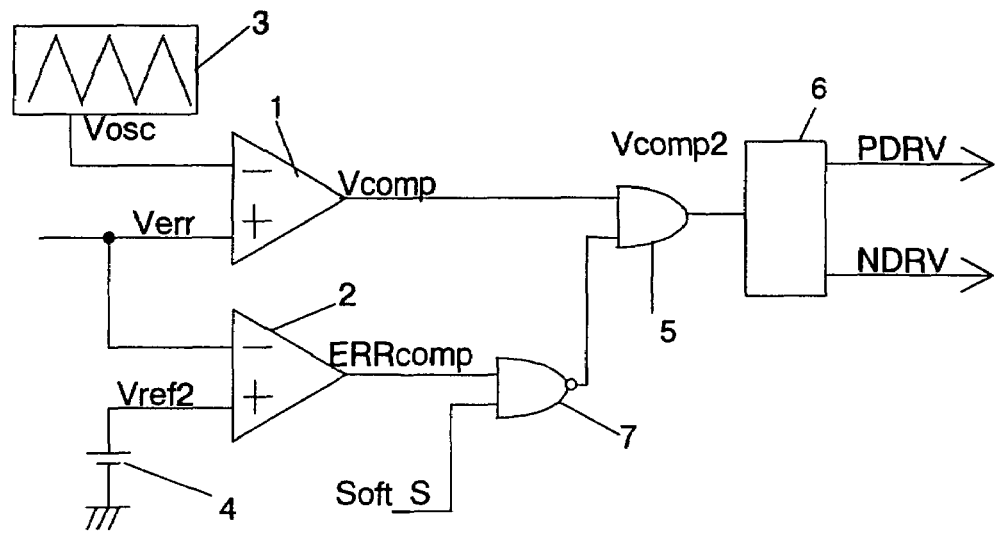
FIG. 1 is an explanatory diagram showing a synchronous rectifying type switching regulator control circuit including a soft start circuit according to an embodiment of the present invention.

Hereinafter, the present invention will be described with reference to the accompanying drawings. FIG. 1 is an internal circuit diagram showing a synchronous rectifying type switching regulator control circuit including a soft start circuit according to an embodiment of the present invention.

Figure 3:
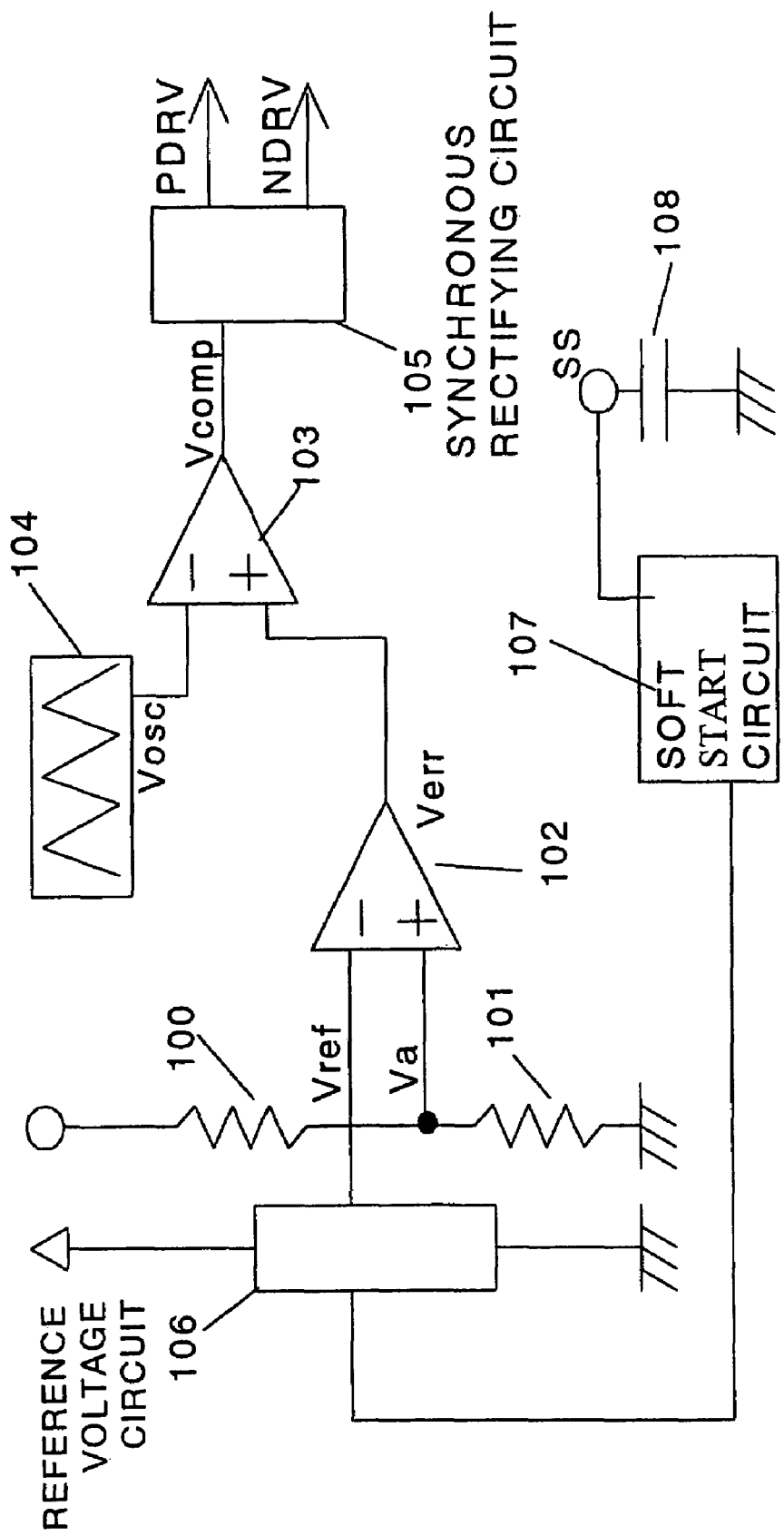
FIG. 3 is an explanatory diagram showing a conventional synchronous rectifying type switching regulator control circuit including a soft start circuit.

A Vosc signal outputted from an oscillating circuit 3 and a Verr signal outputted from an error amplifying circuit are inputted to a comparing circuit 1 and a control signal for controlling external switches is outputted as a Vcomp signal from the comparing circuit 1. Here, the soft start circuit 107, the reference voltage circuit 106, the divisional resistors 100 and 101 for output voltage division, and the error amplifying circuit 102 as shown in FIG. 3 in the conventional example compose a circuit portion. The output signal from the error amplifying circuit 102 of the circuit portion can be used as the Verr signal. The Verr signal and a reference voltage Vref2 are compared with each other by a comparing circuit 2. A MIN duty at the time of turning on a power source is limited according to a waveform of the Verr signal and a soft start signal Soft_S through a NAND circuit 7, an AND circuit 5, and a synchronous rectifying circuit 6.

Figure 2:
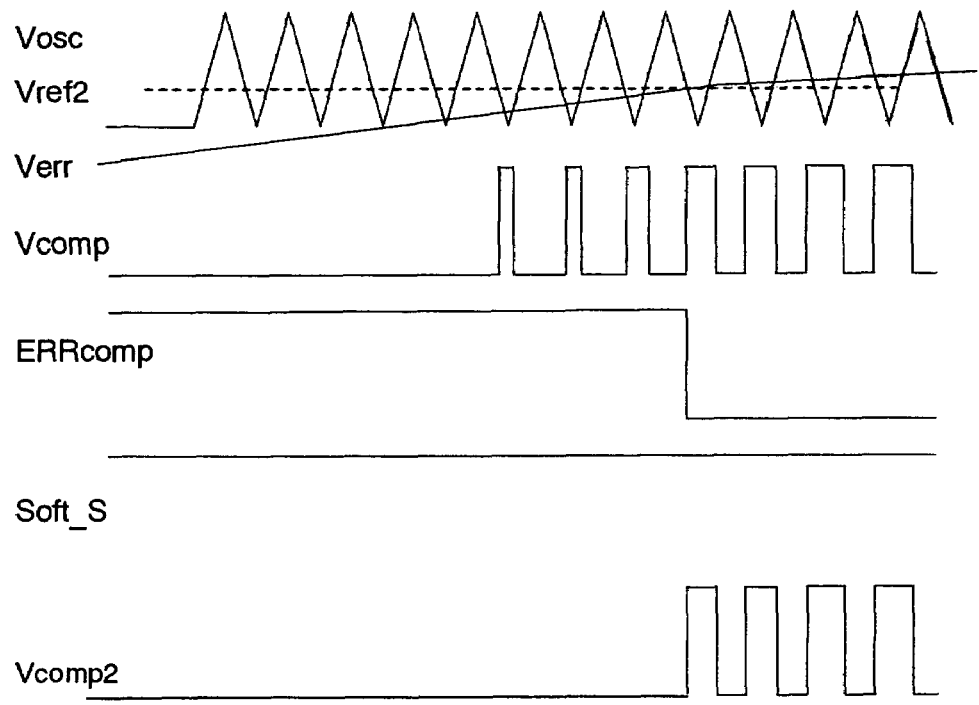
FIG. 2 is an explanatory chart showing operation of the synchronous rectifying type switching regulator control circuit including the soft start circuit as shown in FIG. 1.

Next, the operation of the synchronous rectifying type switching regulator control circuit of the present invention will be described in detail with reference to FIG. 2. In FIG. 2, the triangular wave (Vosc signal) outputted from the oscillating circuit 3 and the Verr signal outputted from the error amplifying circuit are compared with each other by the comparing circuit 1. A waveform outputted from the comparing circuit 1 becomes the Vcomp signal. The Verr signal gradually rises from the time of turning on the power source. Therefore, as is apparent from FIG. 2, the waveform of the Vcomp signal changes from a LOW state to a small duty output state and then changes to a larger duty output state. Although the reference voltage Vref2 and the Verr signal are compared with each other by the comparing circuit 2, a level of the Verr signal does not reach the reference voltage Vref2 until the Verr signal rises to the middle of the triangular wave at the time of turning on the power source. As a result, an ERRcomp signal is a high (HI) level until the level of the Verr signal reaches the reference voltage Vref2. The soft start signal Soft_S is a high (HI) level at the time of turning on the power source. Thus, the NAND circuit 7 outputs a LOW level signal. Then, a Vcomp2 signal from the AND circuit 5 becomes a LOW level.

Next, when the Verr signal rises and reaches the reference voltage Vref2, the ERRcomp signal becomes a LOW level, so that the NAND circuit 7 outputs an HI level signal. Then, the Vcomp2 signal becomes the same waveform as that of the Vcomp signal, thereby performing normal operation. Although not shown in FIG. 2, the soft start signal Soft_S becomes a LOW level after the completion of the soft start period. Therefore, even when the level of the Verr signal becomes equal to or smaller than the reference voltage Vref2 after the completion of the soft start period, the Vcomp2 signal has the same waveform as that of the Vcomp signal. As a result, the normal operation is performed so as to output a desirable constant voltage as an output voltage by changing the Vcomp2 signal from a 0%-duty to a maximal (MAX) duty.

That is, unless the Verr signal does not reach a level of the triangular wave during the soft start period at the time of turning on the power source, a rectangular wave is not outputted. Therefore, it is apparent that the MIN duty is limited at the time of turning on the power source. It is also apparent that the normal operation in which the duty is not limited is performed after the soft start period.

In the embodiment of the present invention, a reference voltage is set, a value (magnitude) of a duty is determined from comparison with the set reference voltage, and the MIN duty is limited based on the determination. It is also possible to perform limitation so as not to output the Vcomp signal at the MIN duty by preventing a lower part of the triangular wave from being formed in a convex shape without setting the reference voltage. Even when another logical circuit configuration is used, the same effect as that of the present invention is evidently obtained. Therefore, the present invention is not limited to the circuit configuration shown in FIG. 1.

What is claimed is:

1. A synchronous rectifying type switching regulator control circuit, comprising:
    a soft start circuit that outputs a soft start signal;
    a first reference voltage circuit that receives the soft start signal and outputs a first reference voltage;
    a voltage dividing circuit that divides an output voltage and outputs a divided voltage;
    an error amplifying circuit that amplifies a difference of the first reference voltage and the divided voltage and outputs an error voltage Verr;
    an oscillator that outputs a triangular wave;
    a first comparing circuit that compares the triangular wave with the error voltage Verr and outputs an output pulse Vcomp;
    a second reference voltage circuit that outputs a second reference voltage;
    a second comparing circuit that compares the second reference voltage with the error voltage Verr and outputs a voltage ERRcomp;
    a logic circuit that receives the soft start signal, the output pulse Vcomp, and the voltage ERRcomp and outputs a voltage Vcomp2, and that outputs the output pulse Vcomp when the error voltage Verr is higher than the second reference voltage during a soft start period; and a synchronous rectifying circuit that outputs a drive signal for driving a switching element when the logic circuit outputs the output pulse Vcomp to the synchronous rectifying circuit in accordance with the soft start signal and the voltage ERRcomp.

2. A synchronous rectifying type switching regulator control circuit according to claim 1; wherein the second reference voltage is within a range between maximal and minimal voltages of the output signal from the oscillator.

3. A semiconductor integrated circuit comprising the synchronous rectifying type switching regulator control circuit according to claim 1.

4. A semiconductor integrated circuit comprising: a switching regulator; and a synchronous rectifying type switching regulator control circuit according to claim 1 that controls the switching regulator.

5. A synchronous rectifying type switching regulator control circuit, comprising:
   a soft start circuit that outputs a soft start signal;
   a first reference voltage circuit that receives the soft start signal and outputs a first reference voltage;
   a voltage dividing circuit that divides an output voltage and outputs a divided voltage;
   an error amplifying circuit that amplifies a difference of the first reference voltage and the divided voltage and outputs an error voltage Verr;
   an oscillator that outputs a triangular wave;
   a first comparing circuit that compares the triangular wave with the error voltage Verr and outputs an output pulse Vcomp;
   a second reference voltage circuit that outputs a second reference voltage that is within a range between maximal and minimal voltages of the output signal from the oscillator;
   a second comparing circuit that compares the second reference voltage with the error voltage Verr and outputs a voltage ERRcomp;
   a logic circuit that receives the soft start signal, the output pulse Vcomp, and the voltage ERRcomp and outputs a voltage Vcomp2, and that outputs the output pulse Vcomp when the error voltage Verr is higher than the second reference voltage during a soft start period; and
   a synchronous rectifying circuit that outputs a drive signal for driving a switching element when the logic circuit outputs the output pulse Vcomp to the synchronous rectifying circuit in accordance with the soft start signal and the voltage ERRcomp.

6. A semiconductor integrated circuit comprising the synchronous rectifying type switching regulator control circuit according to claim 5.

7. A semiconductor integrated circuit comprising: a switching regulator; and a synchronous rectifying type switching regulator control circuit according to claim 5 that controls the switching regulator.

\* \* \* \* \*